United States Patent

Härtel et al.

[11] 4,434,772
[45] Mar. 6, 1984

[54] COMBUSTION MIXTURE GENERATOR FOR INTERNAL COMBUSTION ENGINES

[75] Inventors: Günter Härtel; Werner Schiele, both of Neuss; Armin Schürfeld, Meerbusch; Valerio Bianchi, Neuss-Hoisten; Anwar Abidin, Meerbusch, all of Fed. Rep. of Germany

[73] Assignee: Bosch & Pierburg System OHG, Neuss, Fed. Rep. of Germany

[21] Appl. No.: 512,313

[22] Filed: Jul. 8, 1983

Related U.S. Application Data

[63] Continuation of Ser. No. 178,823, Aug. 18, 1980, abandoned.

[30] Foreign Application Priority Data

Dec. 6, 1979 [DE] Fed. Rep. of Germany ....... 2949096

[51] Int. Cl.³ ................................................ F02M 31/00
[52] U.S. Cl. .................................. 123/549; 123/545; 261/142
[58] Field of Search ............... 123/523, 545, 549, 552; 261/144, 145, DIG. 39, DIG. 56, 142; 219/205, 206, 207

[56] References Cited

U.S. PATENT DOCUMENTS

| | | | |
|---|---|---|---|
| 1,079,338 | 11/1913 | Hazelton | 123/545 |
| 1,096,989 | 5/1914 | Bentley | 123/549 |
| 1,190,124 | 7/1916 | Lukacsevics | 261/95 |
| 1,278,880 | 9/1918 | De Orlow | 123/549 |
| 1,285,652 | 11/1918 | Eklund | 123/545 |
| 1,354,484 | 10/1920 | Hoyt | 123/545 |
| 1,359,168 | 11/1920 | Guthrie | 123/545 |
| 3,352,545 | 11/1967 | Denine | 261/95 |
| 4,007,720 | 2/1977 | Brettschneider | 123/549 |
| 4,108,125 | 8/1978 | Marcoux | 123/549 |
| 4,256,066 | 3/1981 | Serruys | 123/545 |
| 4,279,234 | 7/1981 | Marcoux | 123/549 |
| 4,327,697 | 5/1982 | Wada | 123/549 |

FOREIGN PATENT DOCUMENTS

| | | | |
|---|---|---|---|
| 106897 | 3/1927 | Austria | 261/DIG. 39 |
| 529746 | 12/1921 | France | 261/DIG. 39 |
| 9742 | 10/1923 | Netherlands | 261/DIG. 39 |
| 24289 | of 1914 | United Kingdom | |

*Primary Examiner*—Ronald H. Lazarus
*Attorney, Agent, or Firm*—Toren, McGeady and Stanger

[57] ABSTRACT

A carburettor or other combustible mixture generator 1 has a mixture chamber 3 surrounded by a tubular wall 2 which has an inner skin 9 and an outer skin 10 with an annular heating chamber 11 between them. Heating fluid such as exhaust gas or heated engine cooling water flows through the chamber 11 from an inlet 12 to an outlet 13 and so heats the inner skin 9. A fuel metering device 6, 7 directs the fuel on to the surface of the heated skin 9 and thus causes the fuel to be evaporated within the mixing chamber 3 upstream of a throttle 4. This greatly improves the uniformity of the mixture and the uniformity of its distribution through an inlet downstream of the throttle 4.

28 Claims, 12 Drawing Figures

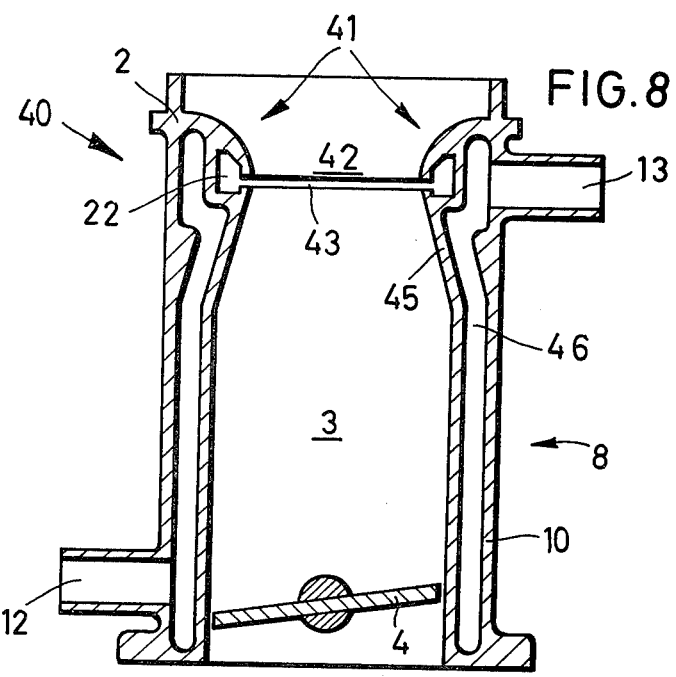
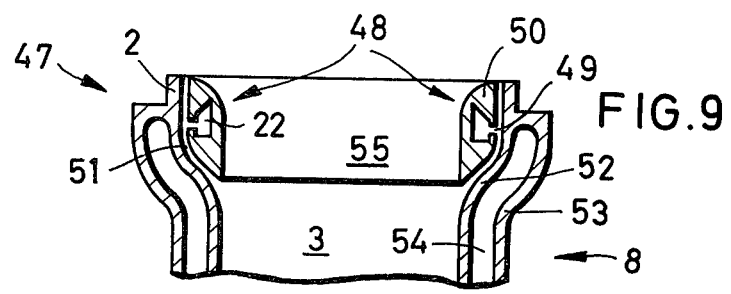
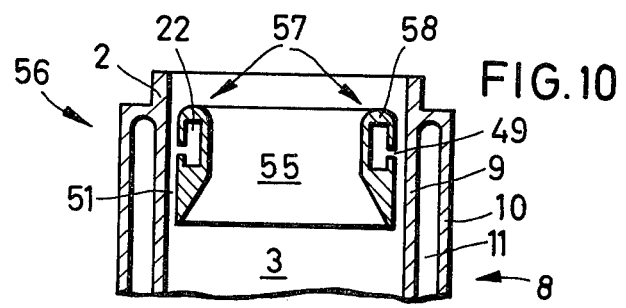

COMBUSTION MIXTURE GENERATOR FOR INTERNAL COMBUSTION ENGINES

This application is a continuation of application Ser. No. 178,823, filed Aug. 18, 1980, now abandoned.

The invention relates to carburettors or other combustible mixture generators for internal combustion engines, the generator comprising a tubular wall which defines a flowpath for the mixture and is heated over part of its length, a throttle member disposed downstream of the tubular wall and a fuel metering device in a part of a mixture chamber disposed within the upstream part of the tubular wall.

The physical variables of heat and pressure can influence the evaporation of fuel for the purpose of obtaining a good mixture, for a given fuel quality. The supply of heat frequently employed in the carburettors of present day mass-produced vehicles is obtained by preheating of the induction air by heating of the air intakes of the engines of the vehicles. Preheating of the induction air is intended mainly to prevent carburettor icing due to air humidity but leads to a comparatively high increase of the induction mixture temperature with the result of an increased tendency to engine knocking and $NO_x$ emission of the engine. Owing to the poor heat transfer from the induced air to the fuel and because of the relatively rapid precipitation of liquid fuel on the relatively cold walls of the carburettor mixing chamber, such preheating of the induction air leads only to an insufficient degree of fuel evaporation.

To obtain a good mixture and to avoid the disadvantages associated with preheating of the fuel, it has become an increasing practice to heat the intake manifold of the engine with the result that the liquid fuel film disposed on the intake wall is reached by the heat directly and can evaporate. Increasingly stringent requirements made on good mixture distribution and rapid mixture transfer are only inadequately met by these means, since evaporation of the fuel in the intake manifold takes place only in the actual region or immediately upstream of the place at which the manifold divides into the inlet ducts which extend to the individual cylinders of the engine and only incomplete mixing of the induction mixture is possible before the mixture is distributed. Moreover, there is a relatively long distance between the fuel metering place in the carburettor and the fuel evaporating place in the manifold. This leads to there being a large wall surface area which is wetted by fuel. The fuel, which has become precipitated on the wall, cannot follow the induction air flow, thus leading to timing faults in the composition of the induction mixture under non-steady operating conditions. Furthermore, the pressure at the place of evaporation in the manifold varies within wide limits in dependence on the prevailing operating intake pressure of the engine. As a result of this change of the intake manifold pressure, the peripheral conditions governing fuel evaporation are also continuously changed in non-steady state operation and this also gives rise to timing faults in the composition of the induction mixture.

It is the object of the present invention to construct a carburettor or other mixture generator of the kind initially described which avoids the above described disadvantages and so produces a good mixture in conjunction with satisfactory mixture transfer and mixture distribution ability.

According to this invention, we provide a mixture generator as initially described wherein the part of the tubular wall surrounding the mixture chamber is constructed as a heating wall extending from the region of the fuel metering device substantially to the throttle member and the fuel metering device directs part at least of the fuel on to the heating wall.

The fuel metering device directs that part of the fuel which is not directly entrained by the induction airflow in superfine droplets or in a vapour state on to the heating wall. Accordingly, the evaporating preparation of the mixture takes place in use, upstream of the induction manifold of the engine within the mixing chamber. Up to full load operation, the throttle member disposed in the induction air stream forms a restrictor at which the induction mixture is very intensively agitated so that a substantially homogeneous mixture is made available at the place at which the induction manifold is divided to provide the induction flow to the individual cylinders of the engine. Since the induction mixture contains practically no liquid fuel constituents on entering the manifold, it follows that wetting of the wall is confined to the mixing chamber. Heat supplied via the tubular heating wall in the mixing chamber results in direct heating and evaporation of the fuel film on the wall over a short distance without any excessive increase in the temperature of the induction mixture. No substantial composition faults of the induction mixture therefore occur because the fuel film on the wall is evaporated rapidly and over the shortest practicable distance. Furthermore, the pressure in the mixing chamber upstream of the throttle member fluctuates only to a small degree over various engine operating ranges so that pressure has practically no variable effect on the evaporation of the fuel. Altogether, a distinctly effective preparation of the mixture in conjunction with satisfactory transfer of the mixture and satisfactory mixture distribution is thus obtained by relatively simple means.

Advantageously, the tubular heating wall is constructed as a jacketed heat exchanger with an annular chamber having means for conducting liquid or gaseous heating medium, such as engine cooling water or exhaust gas, through it. Such a heating system is simple and cheap, because of the available heating medium. However, in order to obtain satisfactory mixture preparation when the engine is cold, it is advantageous if at least the inside of the tubular heating wall is constructed from an electric heating resistance material.

To this end, the part of the tubular heating wall, radially within the annular chamber, may be made of a PTC material. Such a combined heating system offers the important advantage that effective evaporation of fuel can be achieved for all operating states, namely initially when the engine is cold by means of electric heating and thereafter by heating through heated cooling water or exhaust gas. Where subsequent heating is obtained by engine cooling water, it is possible for the annular chamber to be initially emptied so that the tubular heating wall, which is electrically heated on the inside, is thermally insulated by the surrounding empty annular chamber.

Particularly advantageous conditions are obtained if the fuel metering device is constructed so that it directs the fuel in very small droplets with a substantially uniform circumferential distribution on to the tubular heating wall. The very thin and uniform fuel film thus produced on the wall can be rapidly evaporated over a short distance so that satisfactory and uniform mixture preparation can be achieved even in the critical condition of non-steady state operation of the engine to which the generator is fitted.

In one simple embodiment the fuel metering device is provided with a central pre-atomiser provided at a fuel exit. The pre-atomiser ensures that the fuel is directed adequately and in a fine distribution on to the tubular heating wall. Such a generator is particularly simple since, by contrast to known carburettors or other mixture generators, it needs to be constructed with a heating system only for the mixing chamber wall. This can be achieved where appropriate by subsequetntly placing a heating jacket around an existing mixing chamber wall.

Particularly advantageous operating conditions are obtained if the fuel metering device comprises an atomising nozzle having a central fuel exit, an annular gap concentric with the fuel exit, and a constriction at the exit for atomising air under elevated pressure to produce velocity vectors of different magnitude and direction for fuel and atomising air at the exit. This leads to a distinct and effective atomisation of the supplied fuel with the result that a very fine fuel film is produced on the chamber wall which can be easily and rapidly evaporated with a small expenditure of energy. This feature in turn leads to a slight temperature rise of the induction mixture, to evaporation of the fuel film on the wall over an even shorter distance and accordingly to a further improved mixture distribution and to improved mixture transfer, more particularly in non-steady state operation of the engine. To this end it is advantageous if the nozzle exit of the atomiser nozzle is disposed substantially centrally in the mixing chamber and is oriented in the direction of the main mixture flow through the chamber. Given advantageous flow conditions, this results in a particularly uniform circumferential distribution of the fuel.

In another preferred embodiment, the fuel metering device is provided with an annular duct for the introduction of an annular stream of a premixture into the mixing chamber. This offers the advantage that, on being introduced, the fuel is already distributed around the chamber and can thus be applied to the tubular heating wall in a simpler and more uniform manner. A particularly simple structure is obtained by an annular duct which is formed in the tubular wall of the mixing chamber since this obviates the need for fuel metering over the direct flow cross-section of the mixing chamber.

Advantageously, the annular duct is provided with at least one fuel supply duct and at least one duct extending tangentially into the annular duct in the region of the fuel supply duct, for the supply of supplementary air under elevated pressure. In the annular duct, this leads to a rotating flow and therefore to substantially uniform distribution of the premixture around the circumference of the annular duct. This is also advantageous to produce a circumferentially uniformly distributed application of the fuel or premixture on to the tubular heating wall of the mixing chamber.

The premixture may emerge from the annular duct into the mixing chamber in different ways. In one example, the radial inner boundary wall of the chamber has a portion which is porous and permeable to the premixture; such a wall can be made for example, from sintered metal through which the premixture can flow and enter into the mixing chamber. Instead, the boundary wall of the annular duct can have an annular premixture exit gap. It is also possible to provide the annular duct with a series of premixture exit ducts which are uniformly distributed around the circumference of the chamber. These exit ducts can extend from the annular duct, being formed integrally in the tubular wall of the mixing chamber, at an angle to a premixture merging zone which is disposed downstream of the annular duct. The exit ducts can extend to premixture exit ports in the inner face of the tubular wall. Even better operating conditions with respect to uniform fuel distribution are obtained if the exit ducts extend into an annular premixture groove which opens into the mixture chamber. The annular groove permits a uniform discharge of the fuel into the mixing chamber, even if the annular duct has a relatively limited number of exit ducts. In this connection, particular advantages are obtained if the annular premixture groove is additionally provided with an additional groove that extends in the direction of mixture flow through the chamber. In conjunction with the annular groove, such an additional groove results in a practically completely uniform distribution of the mixture around the circumference of the mixing chamber.

In a preferred embodiment of a particularly simple construction, the annular duct is disposed upstream of the tubular heating wall. When the annular duct is integrated with the wall of the mixing chamber the latter need only be constructed with two walls one of which contains the annular duct and one of which contains the annular chamber of the tubular heating wall. However, to enable the premixture to be preheated in the annular chamber and immediately thereafter, it is advantageous to construct the tubular heating wall so that its annular chamber at least partially surrounds the annular duct. Evaporation of the fuel film on the wall of the mixing chamber can then be effected over an even shorter distance.

In the case of a carburettor or other mixture generator with a fixed air inlet it is advantageous if the annular duct is formed in a constricting Venturi zone in the tubular wall of the mixing chamber and extends into the throat of the Venturi and is surrounded by the annular chamber of the tubular heating wall. This results in optimum space utilisation of the Venturi region, which is in any case constricted. It also results in preheating of the premixture in the annular duct, thus assisting the evaporation and results in very advantageous extraction of the premixture from the annular duct by means of the decrease of pressure which occurs in the Venturi throat. Exit flow from the annular duct can be obtained in the manner already described by means of a porous boundary wall, an annular exit gap or by means of ports which are distributed around the circumference of the mixing chamber.

In another preferred embodiment the annular duct is formed in a flow member disposed radially within the tubular wall and the duct opens outwardly into an annular air gap through which induction air flows and which surrounds the flow member. In this case the premixture is also conducted into an annular region which directly adjoins the tubular heating wall and is evaporated there or is mixed with the induction air. The construction of the duct in a flow member ensures reliable air flow without unacceptable back pressure. Since only a small proportion of the induction air must flow in the annular air gap to conduct the premixture or the evaporated fuel from the annular air gap into the mixing chamber, it is convenient if the flow member has a central air passage of large surface area disposed radially within the annular duct. Advantageous conditions are also obtained if the portion of the tubular wall surrounding the flow member is radially enlarged. In this case, the flow member can be constructed so that the diameter of its central passage substantially corresponds to the diameter of the mixing chamber just downstream of the flow member, thus obviating any back pressure effects. Furthermore, the annular duct, opening outwardly into the annular air gap, offers the important advantage that centrifugal force causes preferred concentration and emergence of the fuel particles on the external circumference of the duct. The fuel or premixture thus passes over only a short distance on to the tubular heating wall.

In another preferred embodiment the flow member is constructed with a pre-atomiser configuration. This reduces the free cross-section of the induction flow so that reduced pressure conditions, similar to those in carburettors with a fixed choke, are obtained in the exit region of the annular duct. Instead, it is also possible for the central air passage of the flow member to be constructed with a constricted Venturi shape. This also results in favourable reduced pressure conditions and the premixture is conducted over a short distance via the annular air gap on to the tubular heating wall, the inside of which can merge smoothly with the Venturi.

In another embodiment the fuel metering device is constructed in the form of an injection nozzle which produces an annular conical stream of fuel. In this way it is possible to ensure that the liquid fuel reaches the tubular heating wall almost entirely in a finely divided form and wetting of an unheated throttle member is avoided. The throttle member is advantageously constructed in the form of a pivotable flap to ensure thorough agitation and mixing of the induction mixture at the throttle position.

As another preferred feature intended to improve the preparation of the mixture, the throttle member is itself heatable. To obtain even more effective evaporation it is also possible for the inside of the tubular heating wall to be constructed of a material with good thermal conductivity and/or with ribs which extend into the mixing chamber. The ribs increase the surface area for heat transfer from the wall to the fuel and prolong the dwell time of the fuel on the tubular heating wall. Such ribs can extend longitudinally and/or around the mixing chamber. For similar reasons grid-like or blade-like insert members may be provided in the flow cross-section of the mixing chamber downstream of the fuel metering device and these insert members preferably have heating means in the same way as the previously mentioned ribs, to effect evaporation of any fuel droplets impinging thereon.

Several examples of combustible mixture generators in accordance with the invention will now be described with reference to the accompanying drawings, in which:

FIG. 8 is a section of a seventh example of a mixture chamber-heated carburettor with an annular duct in a Venturi region thereof;

FIG. 9 is a section of a portion of an eighth example of a carburettor with an annular duct disposed in a flow member within a mixture chamber region of expanded diameter;

FIG. 10 is a section of a portion of a ninth example of a carburettor with an annular duct in a flow member of pre-atomiser configuration;

Figure 1:
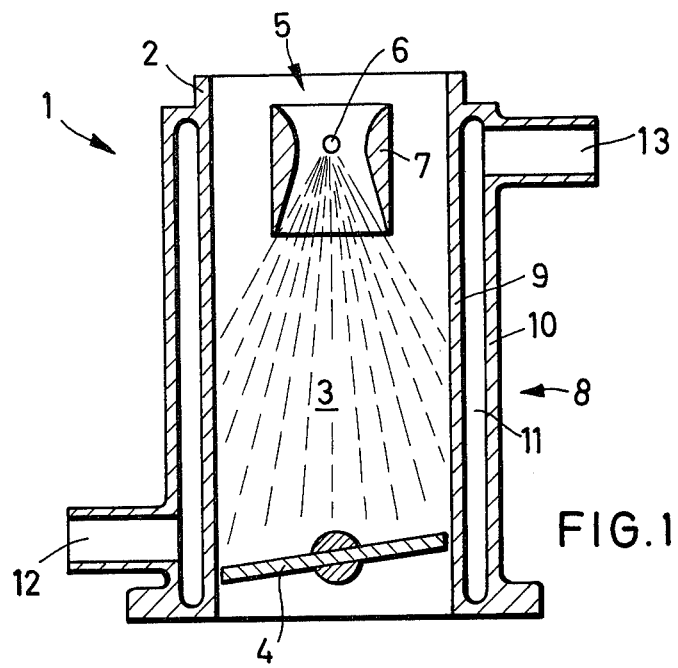
FIG. 1 is a section of a first example of a mixture chamber-heated carburettor with a pre-atomiser.

In all the examples illustrated in FIGS. 1 to 12 a tubular wall 2 surrounds a mixture chamber 3 in the upstream portion of which a fuel metering device, to be described subsequently, is disposed. The chamber is delimited in the downstream direction by a throttle member 4, constructed in the present examples as a pivotable throttle flap. The tubular wall 2 of each carburettor or mixture generator is constructed as a jacketed heating wall 8, through which a heating medium, such as engine cooling water or engine exhaust gas, can flow via connections 12, 13 from the region of the fuel metering device to approximately the throttle member 4. The fuel is supplied by the fuel metering device on to the inside of the heating wall 8 in a finely divided distribution and is thus rapidly evaporated over the shortest possible distance within the mixing chamber 4. Until it is completely opened, the throttle member 4 forms a restrictor plate on which the induction mixture with the evaporated fuel is thoroughly agitated. The different examples of FIGS. 1 to 12 described below, differ from each other mainly by different modes of fuel metering and by the different shapes of the heating wall 8 associated therewith.

In the example of FIG. 1, a carburettor 1 is provided with a fuel metering device 5 in which a centrally disposed pre-atomiser 7 is associated with a central fuel exit 6. In dependence on specific engine parameters, such as the rotational speed and the throttle member opening angle, or the air throughflow, the fuel is metered by a fuel injection device not shown and is supplied to the fuel exit 6. The fuel, mixed in the pre-atomiser 7 with the induction air, passes in the form of small droplets on to an internal face 9 of the heating wall 8 having an annular chamber 11, defined by an outer wall 10. The face 9 surrounds the pre-atomiser 7 and terminates in the region of the throttle element 4.

Figure 2:
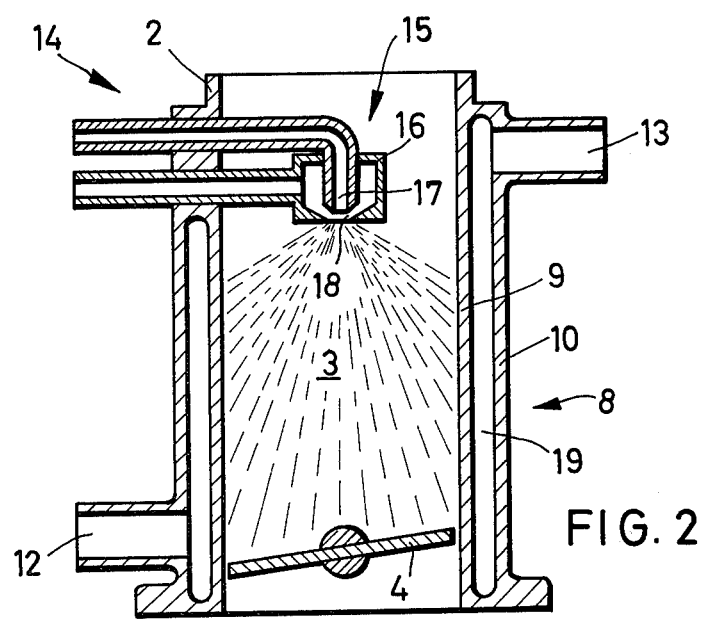
FIG. 2 is a section of a second example of a mixture chamber-heated carburettor with an atomiser nozzle.

The example of FIG. 2 differs from that of FIG. 1 substantially only in that the carburettor 14 has a fuel metering device 15 in the form of an atomising nozzle 16. The latter has a central fuel exit 17 and an annular gap 18, concentric therewith, which is supplied with atomising air under a high pressure. In the region of the nozzle exit, the atomising air is throttled in radially constricting configuration so that a distinct and effective fuel atomisation occurs as a result of the fuel and atomising air velocity vectors of different magnitude and direction. The atomising nozzle 16 is disposed centrally in the mixing chamber 3 and is connected by means of supply ducts not shown. The supply ducts extend through the tubular wall 2 so that the heating wall 8 of this example has an annular chamber 19 which surrounds the atomiser nozzle 16 only in the region outside the supply ducts and then extends approximately to the supply ducts.

Figure 3:
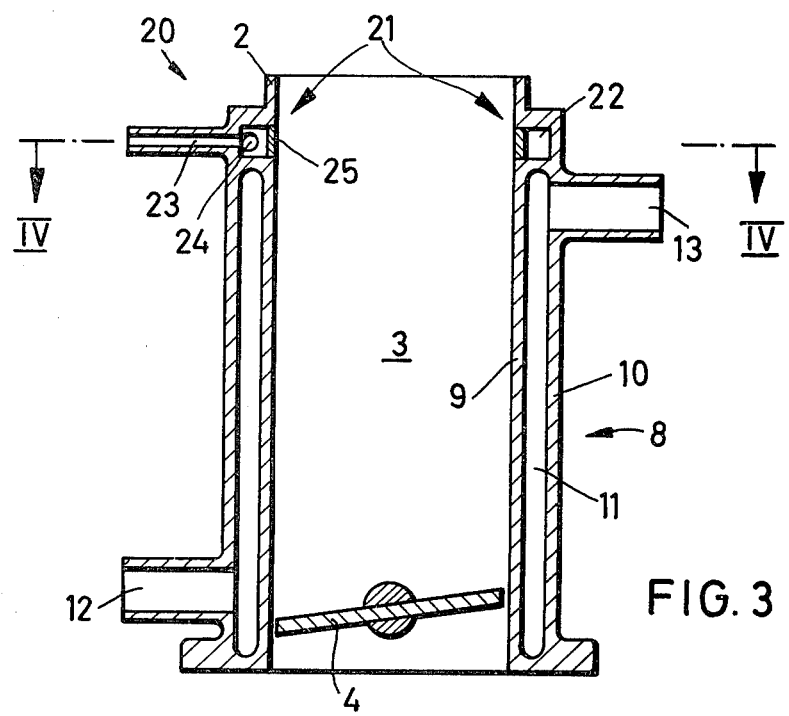
FIG. 3 is a section of a third example of a mixture chamber-heated carburettor with an annular duct in its tube wall adapted for fuel metering.
Figure 4:
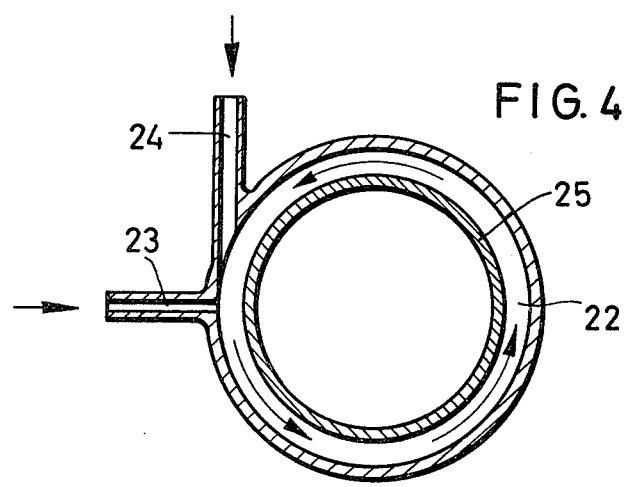
FIG. 4 shows the annular duct of the third example in a diagrammatic section along the line IV—IV of FIG. 3.

In practice, the example of FIG. 3 differs from the example of FIG. 1 only in that the carburettor 20 is provided with a fuel metering device 21 with an annular duct 22 formed upstream of the heating wall 8 in the tubular wall 2. As shown in the section of FIG. 4, a fuel supply duct 23 and a duct 24 attached tangentially to the annular duct 22 in the region of the fuel supply duct extend into the aforementioned annular duct 22 for the purpose of conducting supplementary air under elevated pressure. The tangentially inflowing supplementary air mixes with the fuel and a rotating flow is produced in the annular duct 22 to give rise to an approximately uniform distribution of the premixture over the circumference of the annular duct 22. In the present example the annular duct 22 is provided with a porous inner boundary wall 25, for example of sintered metal. The premixture, uniformly distributed over the circumference, can emerge via the boundary wall 25 into the mixing chamber 3 and can pass to the internal wall 9 of the heating wall 8, which adjoins the wall 25 directly downstream.

Figure 5:
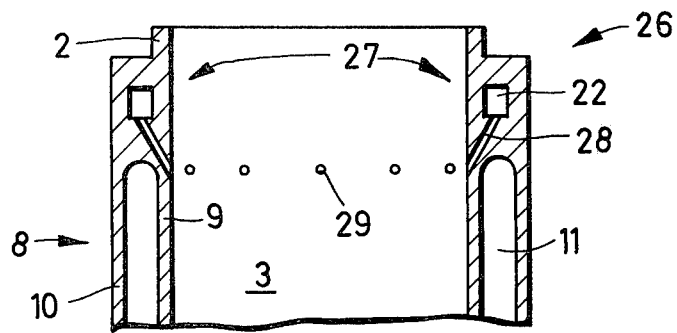
FIG. 5 is a section of a portion of a fourth example of a carburettor with an annular duct which is disposed in the tubular wall and is connected to individual exit ports leading to the mixture chamber.

In the example illustrated in FIG. 5, a carburettor 26 is provided with a fuel metering device 27 having an annular chamber 22 provided with premixture exit ducts 28, distributed around the circumference of the chamber. By contrast to the example illustrated in FIGS. 3 and 4, the exit ducts extend at an angle to a premixture merging zone disposed downstream of the annular duct 22. In the aforementioned merging zone the exit ducts 28 terminate in premixture exit ports 29, distributed around the circumference of the mixing chamber 3, directly upstream of the heating wall 8. The premixture flows via the exit ducts 28 and via the exit ports 29 into the mixture chamber 3 and from there passes to the internal surface 9 of the heating wall 8.

Figure 6:
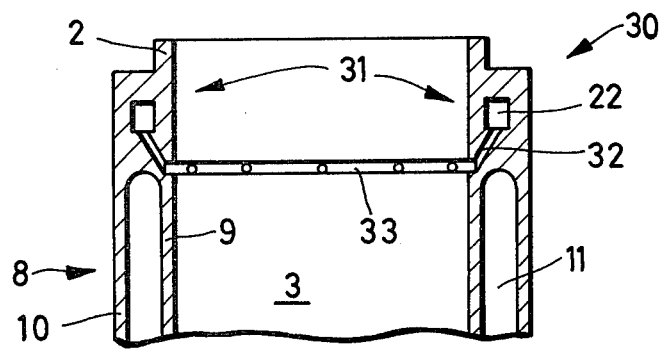
FIG. 6 is a section of a portion of a fifth example of a carburettor with an annular duct which is disposed in the tubular wall and is associated with a circumferential annular groove.

In practice, the example of FIG. 6 differs from that of FIG. 5 only in that the carburettor 30 is provided with a fuel metering device 31 whose annular duct 22 disposed in the pipe wall 2, communicates via premixture exit ducts 32, which correspond to the premixture exit ducts 28 of FIG. 5, with an annular premixture groove 33 disposed circumferentially on the inside of the mixing chamber 3 directly upstream of the heating wall 8. The annular premixture groove opens into the mixture chamber 3 and, by comparison with example of FIG. 5, permits a more uniform premixture distribution over the mixing chamber circumference.

Figure 7:
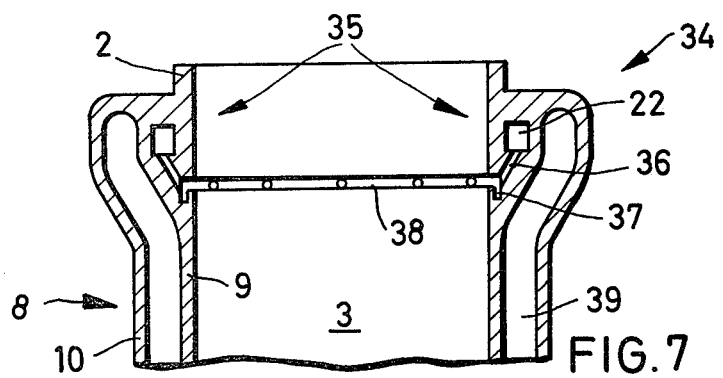
FIG. 7 shows a modification of the example shown in FIG. 6 with a cut associated with the annular groove and with a heating wall extending round the annular duct.

In the example of FIG. 7, the carburettor 34 is provided with a fuel metering device 35 whose annular duct 22 disposed in the tubular wall 2, communicates via premixture exit ducts 36, which correspond to the exit ducts 28 and 32 in FIGS. 5 and 6, with a circumferential groove 37 associated with a circumferential annular premixture groove 38, which corresponds to the annular premixture groove 33 in FIG. 6. The groove 37 associated with the annular premixture groove 38 which opens into the mixture chamber 3 permits an even more uniform premixture distribution around the circumference of the mixing chamber. By contrast to the examples of FIGS. 3 to 6, the example of FIG. 7 also features an annular chamber 39 of the heating wall 8 which is radially enlarged in the region of the annular duct 22 in the tubular wall 2, and extends around the duct 22. This results in preheating of the premixture in the annular duct 22 to permit the fuel to evaporate even more rapidly on the internal face 9 of the heating wall 8.

In the example of FIG. 8, a carburettor 40 is provided with a fuel metering device 41 with an annular duct 22 which is formed in a port of the tubular wall 2 which is constricted to form a Venturi 42. The duct 22 extends via an annular premixture exit gap 43, approximately into the throat of the Venturi 42. The exit gap 43 may be replaced by a porous boundary wall as in the example of FIG. 3 or by individual exit ports, which are distributed around the circumference of the Venturi. The heating wall 8 in this example is also provided with an annular chamber 46, defined by an internal wall 45 and surrounding the outside of the annular duct 22. As shown in FIG. 8, the internal wall 45 is constricted in the direction towards the Venturi 42 to provide a uniform transition from the Venturi 42 into the remaining part of the mixture chamber 3. In the region of minimum pressure, this compact construction permits ready induction of the premixture from the annular duct 22.

In the example of FIG. 9, a carburettor 47 is provided with a fuel metering device 48 whose annular duct 22 is constructed in a flow member 50 and extends via an external annular premixture exit gap 49 into an annular air gap 51 between the flow member 40 and an internal part 52 of the heating wall 8. The heating wall is therefore bounded by an annular chamber 54 which is defined by an external wall 53 and surrounds the annular duct 22 at a distance. The premixture exit gap 49 may, of course, be replaced by a porous boundary wall as in the example of FIG. 3 or by means of individual exit ports, which are distributed around the circumference. In the premixture circulating in the annular duct 22, centrifugal forces concentrate fuel components preferentially on the external circumference of the annular duct 22 so that the fuel can emerge therefrom with acceleration. Induction air passing via an annular air gap 51 ensures that the premixture or the fuel, which evaporates from the internal wall 52, is entrained in the flow direction. The heating wall 8 in this example is radially enlarged in the region of the flow member 50 so that this can have a large central passage 55 whose internal diameter corresponds approximately to the mixing chamber diameter. No back pressure effect is thus present.

In the example of FIG. 10, a carburettor 56 is provided with a fuel metering device 57 whose annular chamber 22 opens via an annular premixture exit gap 49 in an outward direction into an annular air gap 51, as in the example of FIG. 9. The annular gap 22 is disposed in a flow member 58 of pre-atomiser configuration which has a large central air passage 55 and is surrounded at a distance by the heating wall 8. Accordingly, a pressure reduction is produced in the annular duct exit region which can also be differently constructed in the above described manner, as in carburettors with a fixed air inlet. The reduced pressure permits ready exit of the premixture from the annular duct 22.

Figure 11:
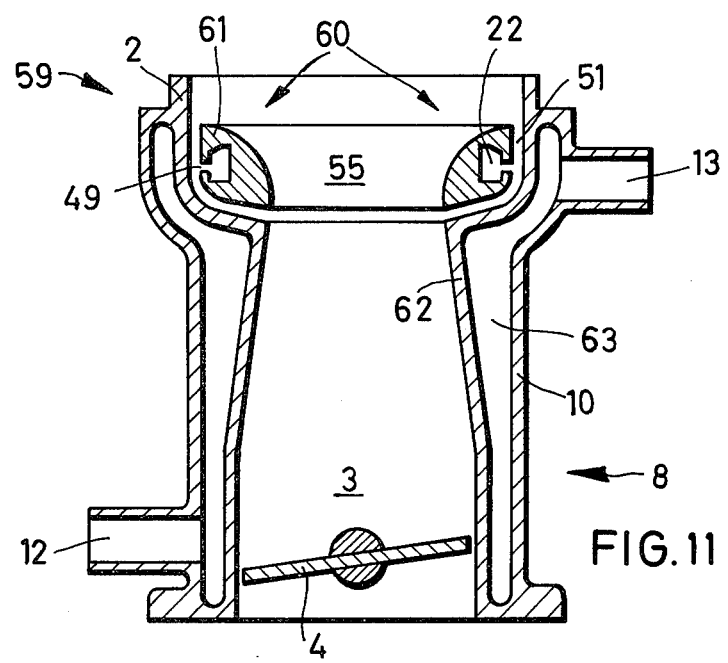
FIG. 11 is a section of a tenth example of a mixture chamber-heated carburettor with an annular duct in a Venturi-shaped flow member; and, FIG. 12 is a section of an eleventh example of a mixture chamber-heated mixture generator with an injection nozzle.

In the example of FIG. 11, a carburettor 59 is provided with a fuel metering device 60 whose annular duct opens via an annular premixture exit duct 49 outwardly into an annular air gap 51, as in the examples of FIGS. 9 and 10, and is formed in a flow member 61 having a central air passage 55 provided with a constriction of Venturi configuration. As in the example of FIG. 8, the heating wall 8 is also provided with an internal wall 62 which is constricted in the direction towards the Venturi region or towards the central air passage 55 and extends into the internal contour of the annular flow member 61 in order to achieve a uniform transition. The heating wall 8 is also provided with an annular chamber 63 which also surrounds the annular duct 22. In this compact construction, in which the annular duct 22 is integrated with a Venturi nozzle, the premixture also passes via the short distance of the annular air gap 51 to a heated internal wall 62 and from there in evaporated form into the mixing chamber 3.

Figure 12:
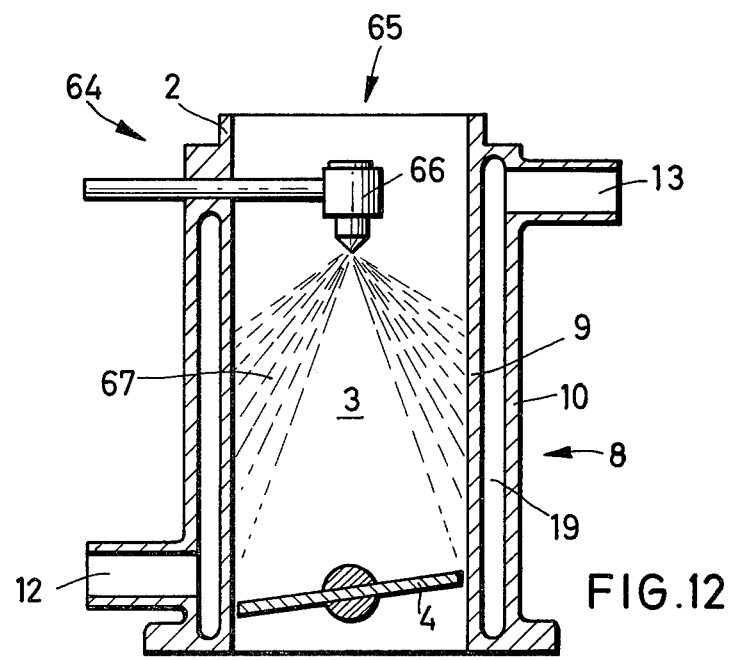

In the example of FIG. 12, a fuel injection mixture generator 64 is provided with a fuel metering device 65 in the form of an injection nozzle 66 with an annular, conical injection zone 67. This ensures that the fuel, in finely divided form, in practice reaches only the internal face 9 of the heating wall 6 and wetting of the unheated throttle element 4 by fuel is avoided.

Apart from the illustrated and described examples numerous modifications may be made, for example in connection with fuel metering and the detail construction of the heating wall. Heated throttle elements, steps designed to increase the surface area of the internal wall of the heating wall 8, such as ribs or porous layers and insert members disposed in the flow cross-section of the mixing chamber 3, such as unheated or heated grids or blades can also be employed. These steps encourage evaporation of the fuel within the mixing chamber to ensure good mixture preparation at this place with the result of improved engine operating conditions, especially under non-steady state operating conditions.

We claim:

1. In a combustible mixture generator for an internal combustion engine, said generator comprising an axially extending upwardly arranged tubular wall having an upper end and a lower end and defining a mixture chamber therein, means for heating said tubular wall over at least part of the axial length thereof between the upper end and lower end, a flap-shaped throttle member, means mounting said throttle member at the lower end of said tubular wall and fuel metering means for directing fuel into said mixture chamber at the upper end thereof, said tubular wall comprising a double wall heat exchanger jacket defining an annular chamber within said double wall, means for conducting heating fluid through said annular chamber, the improvement wherein said double wall extending axially from adjacent said fuel metering means substantially to said throttle member with the throttle member located between the upper and lowr ends of said annular chamber, said fuel metering means is located between upper and lower ends of said tubular wall and is operative to direct substantially all of said fuel onto the inner surface of said double wall defining the mixture chamber between said fuel metering means and said throttle member, said double wall comprising an inner and an outer wall and said means for heating said double wall comprises electrical resistance heating material located within the inner wall of said double wall.

2. A generator as claimed in claim 1, in which at least part of said inner wall is composed of PTC material.

3. A generator as claimed in claim 1, in which said fuel metering means comprises means defining a fuel exit and central pre-atomiser means provided at said fuel exit.

4. A generator as claimed in claim 1, in which said fuel metering means includes an atomising nozzle, means defining a central fuel exit in said nozzle, means defining an annular gap concentric with said fuel exit and a constriction at said exit for atomising air under elevated pressure to produce velocity vectors of different magnitudes and directions for fuel and air at said exit.

5. A generator as claimed in claim 4, in which said exit of said atomizing nozzle is disposed substantially centrally of said mixing chamber and is directed in the direction of a main air and fuel flow through said chamber.

6. A generator as claimed in claim 1, in which said fuel metering means includes means defining an annular duct extending around and communicating with said mixing chamber for the introduction of an annular stream of a pre-mixture into said mixing chamber.

7. A generator as claimed in claim 6, in which said annular duct is formed in said tubular wall of said mixing chamber.

8. A generator as claimed in claim 6, further comprising means defining at least one fuel supply duct communicating with said annular duct and means defining at least one air duct which merges tangentially into said annular duct adjacent said fuel duct, and means for supplying supplementary air under elevated pressure to said at least one air duct.

9. A generator as claimed in claim 6, further comprising porous internal boundary wall means associated with said annular duct, said wall means being permeable to said pre-mixture and communicating said annular duct with said mixing chamber.

10. A generator as claimed in claim 9, in which said porous wall means is of sintered metal.

11. A generator as claimed in claim 6, further comprising means defining an annular pre-mixture exit gap communicating said annular duct with said mixture chamber.

12. A generator as claimed in claim 6, further comprising means defining a plurality of pre-mixture exit ducts communicating said annular duct with said mixture chamber, said pre-mixture exit ducts being uniformly distributed around said mixture chamber.

13. A generator as claimed in claim 12, in which said exit ducts extend at an angle from said annular duct, said annular duct being integrated into said tubular wall of said mixing chamber, said exit ducts communicating said annular duct with a pre-mixture entry zone of said mixture chamber downstream of said annular duct.

14. A generator as claimed in claim 13, further comprising means defining pre-mixture exit ports in said tubular wall, said ports communicating said exit ducts with said mixture chamber.

15. A generator as claimed in claim 13, further comprising means defining an annular pre-mixture groove disposed around said tubular wall, said groove communicating said exit ducts with said mixture chamber.

16. A generator as claimed in claim 15, further comprising means defining additional groove means extending from said annular pre-mixture groove in a direction parallel to a direction of main mixture flow through said chamber.

17. A generator as claimed in claim 6, in which said annular duct is disposed upstream of said inner wall.

18. A generator as claimed in claim 6, in which said annular duct is at least partially surrounded by said annular chamber in said tubular wall.

19. A generator as claimed in claim 6, further comprising means forming a converging venturi zone in said mixture chamber, said annular duct being disposed in said converging venturi zone, said annular duct communicating with a throat of said venturi zone and being surrounded by said annular chamber of said tubular wall.

20. A generator as claimed in claim 6, further comprising a flow member disposed radially within said tubular wall, said annular duct being formed in said flow member, means defining an annular air gap between said flow member and said tubular wall, and said annular duct opening outwardly into said annular air gap and means for flowing induction air through said annular gap.

21. A generator as claimed in claim 20, further comprising means defining a central air passage through said flow member, said central air passage having a relatively large surface area being disposed radially within said annular duct.

22. A generator as claimed in claim 20, in which a portion of said tubular wall which surrounds said flow member is of greater radial extent than the remainder of said tubular wall which surrounds said mixture chamber.

23. A generator as claimed in claim 20, in which said flow member is shaped to form pre-atomiser means.

24. A generator as claimed in claim 20, in which said central passage through said flow member forms venturi means.

25. A generator as claimed in claim 1, in which said fuel metering means comprises injection nozzle means which is operative to produce an annular conical stream of fuel.

26. A generator as claimed in claim 1, further comprising means for heating said throttle member.

27. A generator as claimed in claim 1, in which said inner wall includes portion of material of good thermal conductivity.

28. A generator as claimed in claim 27, in which said inner wall portion of material of good thermal conductivity includes rib means extending into said mixing chamber.

* * * * *

UNITED STATES PATENT AND TRADEMARK OFFICE
CERTIFICATE OF CORRECTION

PATENT NO. : 4,434,772
DATED : March 6, 1984
INVENTOR(S) : Günter Hartel, et al

It is certified that error appears in the above-identified patent and that said Letters Patent is hereby corrected as shown below:

In the heading of the patent [54] should read as follows:

[54] COMBUSTIBLE MIXTURE GENERATOR FOR INTERNAL COMBUSTION ENGINES

Signed and Sealed this

Twenty-second Day of May 1984

[SEAL]

Attest:

GERALD J. MOSSINGHOFF

Attesting Officer     Commissioner of Patents and Trademarks